US007997455B2

(12) United States Patent
Alluigi

(10) Patent No.: US 7,997,455 B2

(45) Date of Patent: Aug. 16, 2011

(54) HEAD OF A FLUID DISPENSING DEVICE, PROVIDED WITH ELASTIC RETURN MEANS

(75) Inventor: Riccardo Alluigi, Acqui Terme (IT)

(73) Assignee: Guala Dispensing S.p.A., Spinnetta Marengo, Alessandria (IT)

( * ) Notice: Subject to any disclaimer, the term of this patent is extended or adjusted under 35 U.S.C. 154(b) by 708 days.

(21) Appl. No.: 12/106,608

(22) Filed: Apr. 21, 2008

(65) Prior Publication Data

US 2008/0272152 A1 Nov. 6, 2008

(30) Foreign Application Priority Data

May 3, 2007 (IT) .............................. BS2007A0068

(51) Int. Cl.
*G01F 11/00* (2006.01)

(52) U.S. Cl. .................. 222/321.8; 222/340; 222/383.1; 251/237

(58) Field of Classification Search .................... 29/449, 29/453; 221/272, 274, 280; 251/231, 233, 251/236–237; 222/321.1, 321.7–321.8, 340, 222/383.1, 384–385
See application file for complete search history.

(56) References Cited

U.S. PATENT DOCUMENTS 4,159,067 A * 6/1979 Akers ...................... 222/153.02
5,211,315 A * 5/1993 Geier ............................ 222/340
5,560,545 A * 10/1996 Grogan et al. ................ 239/304

FOREIGN PATENT DOCUMENTS

EP 0 861 692 A2 9/1998
EP 1 500 436 A1 1/2005
WO WO 00/33969 6/2000
WO WO 2006/073307 A1 7/2006

OTHER PUBLICATIONS

European Search Report for European Patent Application No. EP 07 42 5272 dated Feb. 26, 2008.

* cited by examiner

*Primary Examiner* — Kevin P Shaver
*Assistant Examiner* — Andrew Bainbridge
(74) *Attorney, Agent, or Firm* — Kilyk & Bowersox, P.L.L.C.

(57) ABSTRACT

The invention relates to a fluid dispensing device with an elastic return or a biasing component that is outside the pumping chamber. When the trigger to the pump is activated the elastic return twists forming a torsion return force. The arrangement improves reliability of the pump device significantly.

23 Claims, 5 Drawing Sheets

HEAD OF A FLUID DISPENSING DEVICE, PROVIDED WITH ELASTIC RETURN MEANS

This application claims the benefit of earlier filed Italian Patent Application No. BS2007A000068 filed May 3, 2007.

TECHNICAL FIELD

The object of the present invention is a dispensing head associable to a container for making a fluid dispensing device, generally a liquid.

In particular, the object of the present invention is a dispensing head, especially trigger-wise, provided with elastic return means suitable for returning the head from the fluid dispensing configuration to the stand-by configuration.

BACKGROUND ART

As known, a dispensing head generally comprises an enclosure that delimits a pumping chamber, a piston sliding into the pumping chamber, a trigger, manually actuable for acting on the piston and causing the fluid dispensing from the pumping chamber and elastic return means, acting on the trigger for returning the head from the dispensing configuration to the stand-by configuration.

Several embodiments of elastic return means exist.

Some embodiments envisage a spring, generally helical and made of a metal material, seated within the dispensing chamber and acting on the piston.

On the other hand, more recent embodiments envisage an elastic element arranged outside the pumping chamber and often made of plastic material; such embodiments allow obtaining important advantages especially in the reduction of the times and methods of assembly of the dispensing head in production.

Some examples of embodiments are shown in documents U.S. Pat. No. 6,267,271, JP-10-235245, U.S. Pat. No. 7,175,056, JP-09-253540, JP-09-314001, JP-10-128184 and U.S. Pat. No. 5,706,984.

However, known solutions comprise elastic elements that in the fluid dispensing step, that is, in the switching of the head from the stand-by configuration to that of dispensing, and vice versa, are subject to intense bending stresses.

Such elastic elements have shown poor reliability during the endurance tests performed, since notches into their structure and breakage occurred after running even a low number of cycles.

SUMMARY OF THE INVENTION

The object of the present invention is to provide a dispensing head provided with elastic return means which should overcome the disadvantages mentioned with reference to the prior art while meeting the above requirements.

Such object is achieved by a dispensing head associable to a container for obtaining a fluid dispensing device. The dispensing head comprises pumping means comprising:

a) dispensing means suitable for sucking the fluid from the container and being actuated for dispensing the fluid outside the device, wherein the dispensing means comprise i) an enclosure (2) delimiting a pumping chamber therein for containing the amount of fluid to be dispensed;

ii) a piston (4) suitable for sliding in the enclosure along a dispensing axis (X);

b) actuating means suitable for being handled for actuating the dispensing means;

elastic return means suitable for influencing the pumping means from a dispensing configuration, wherein the chamber has a reduced volume, to a stand-by configuration, wherein the pumping chamber has a larger volume than the reduced volume, wherein the elastic return means are arranged outside the pumping chamber and comprise a) a return element (10), engageable with the pumping means at an active portion thereof, comprising:

i) a coupling portion (14) suitable for coupling the return element with an abutment (16) of the pumping means;

ii) an elastic portion (20), integral with the coupling portion and projecting therefrom along a torsion axis (Z), wherein the torsion axis is inclined relative to the dispensing axis;

wherein the coupling portion of the elastic element is constrained to the abutment of the pumping means so as to prevent at least partly the stiff rotation of the elastic portion about the torsion axis, obtaining a return action on the pumping means from the dispensing configuration to the stand-by configuration.

DESCRIPTION OF THE PREFERRED EMBODIMENTS

Figure 1:
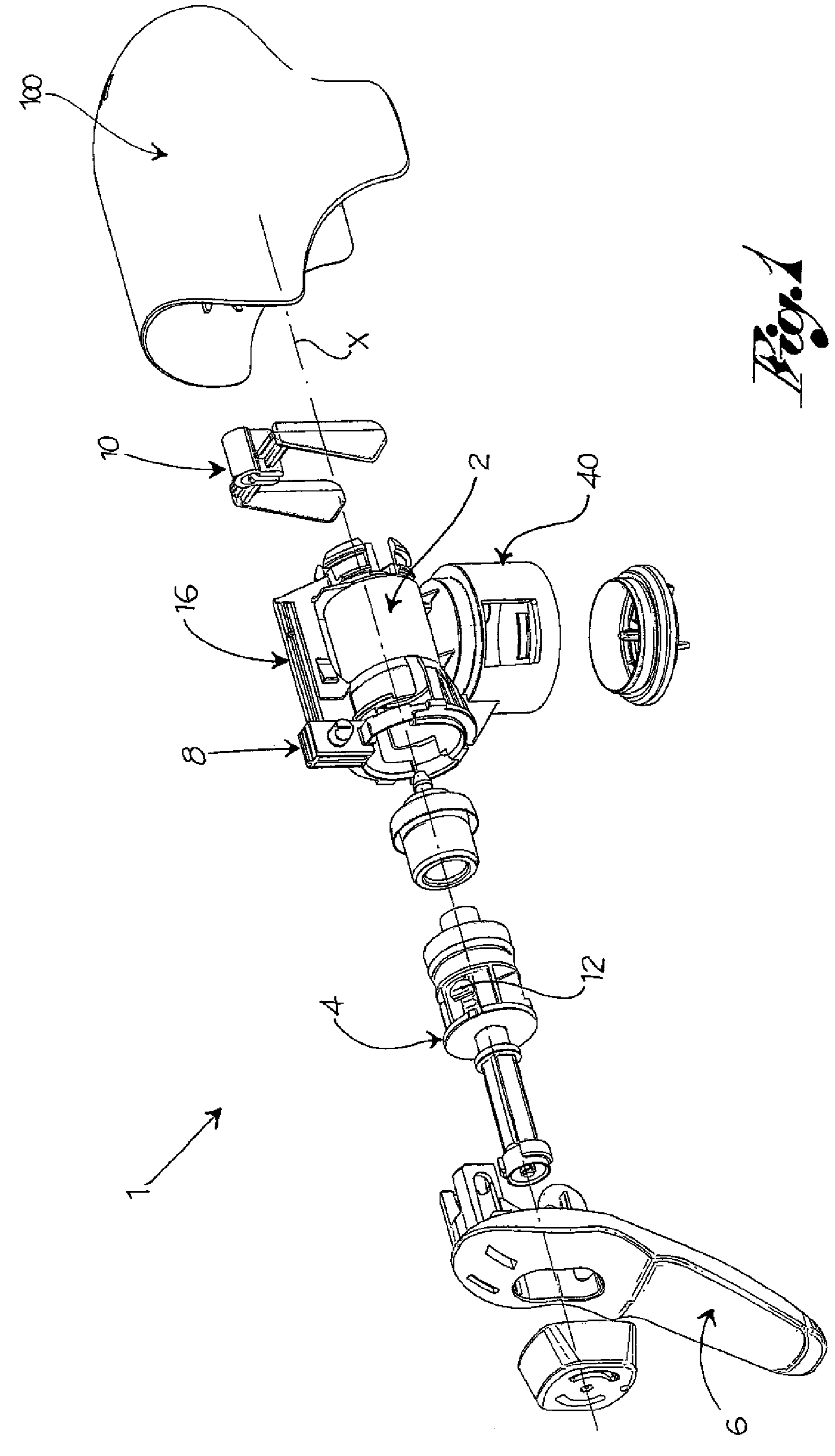
FIG. 1 shows a perspective exploded view of a dispensing head according to an embodiment variation of the present invention.
Figure 2:
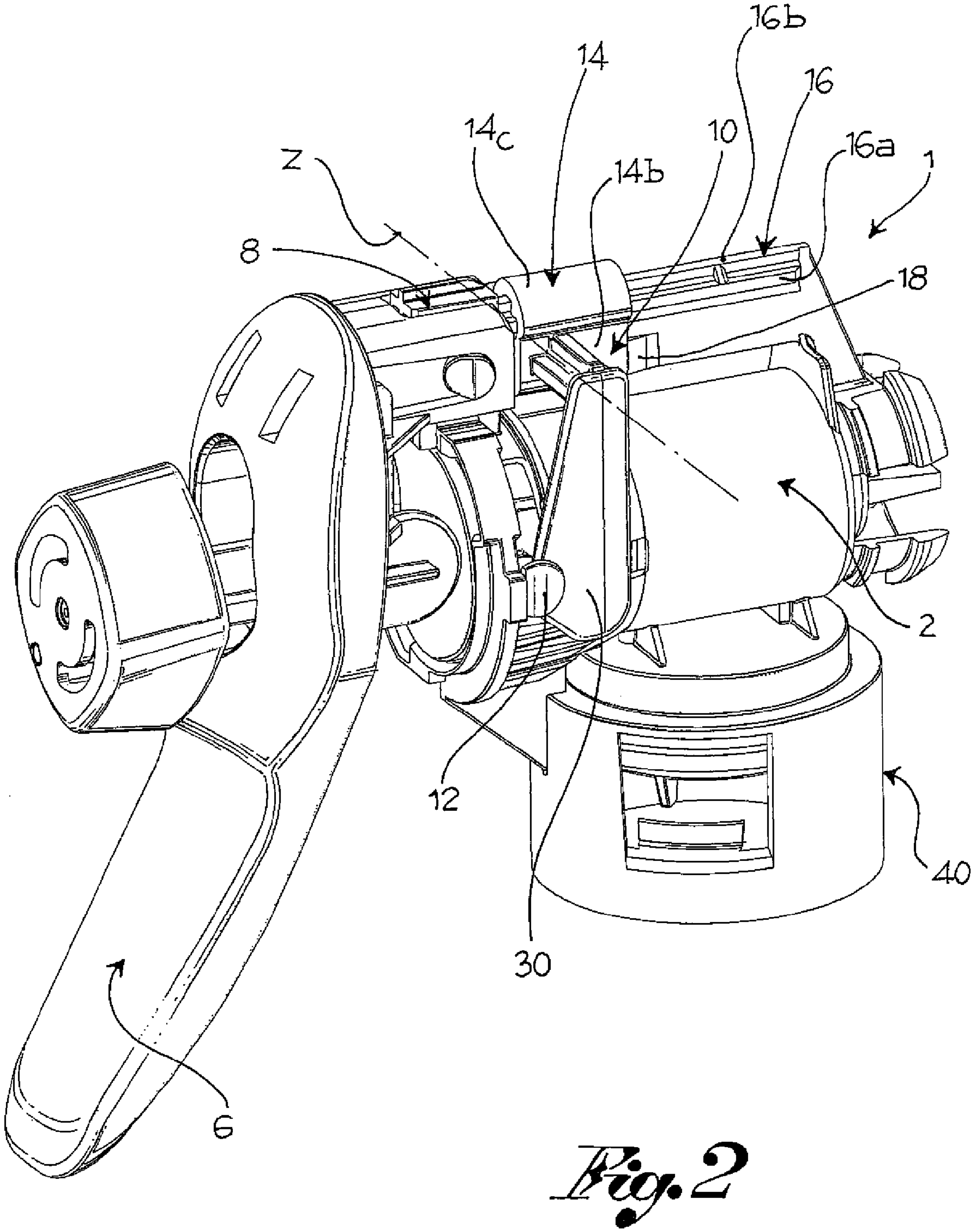
FIG. 2 shows the dispensing head of FIG. 1, with assembled parts, according to a front viewing direction.
Figure 3:
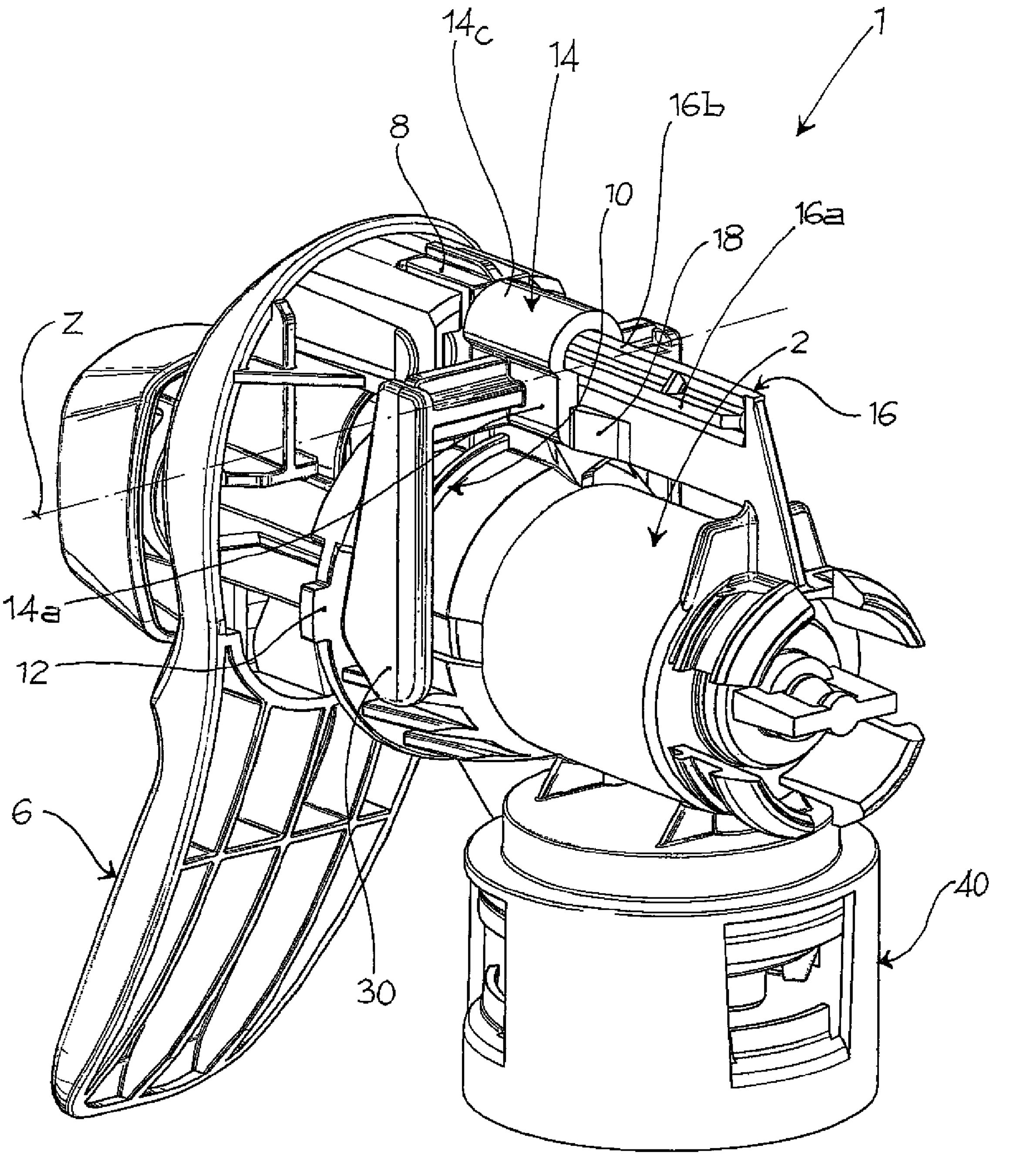
FIG. 3 shows the dispensing head of FIG. 2, according to a back viewing direction.
Figure 4:
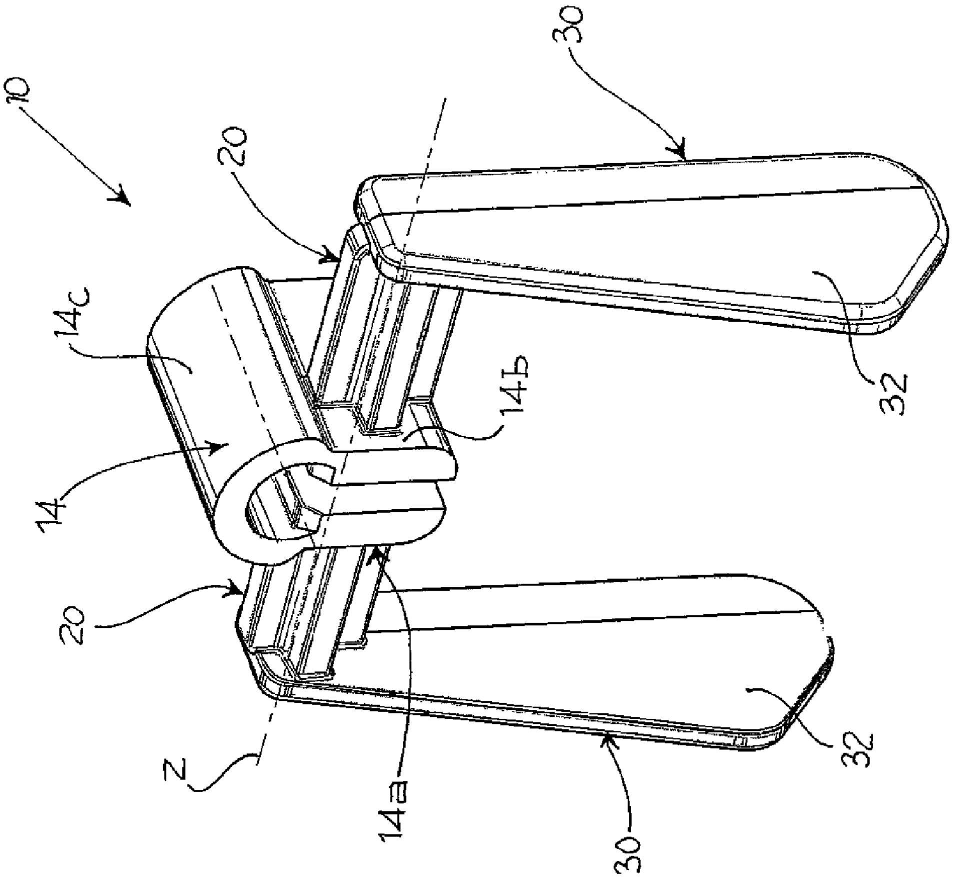
FIG. 4 shows an elastic element of the dispensing head, according to a front viewing direction.
Figure 5:
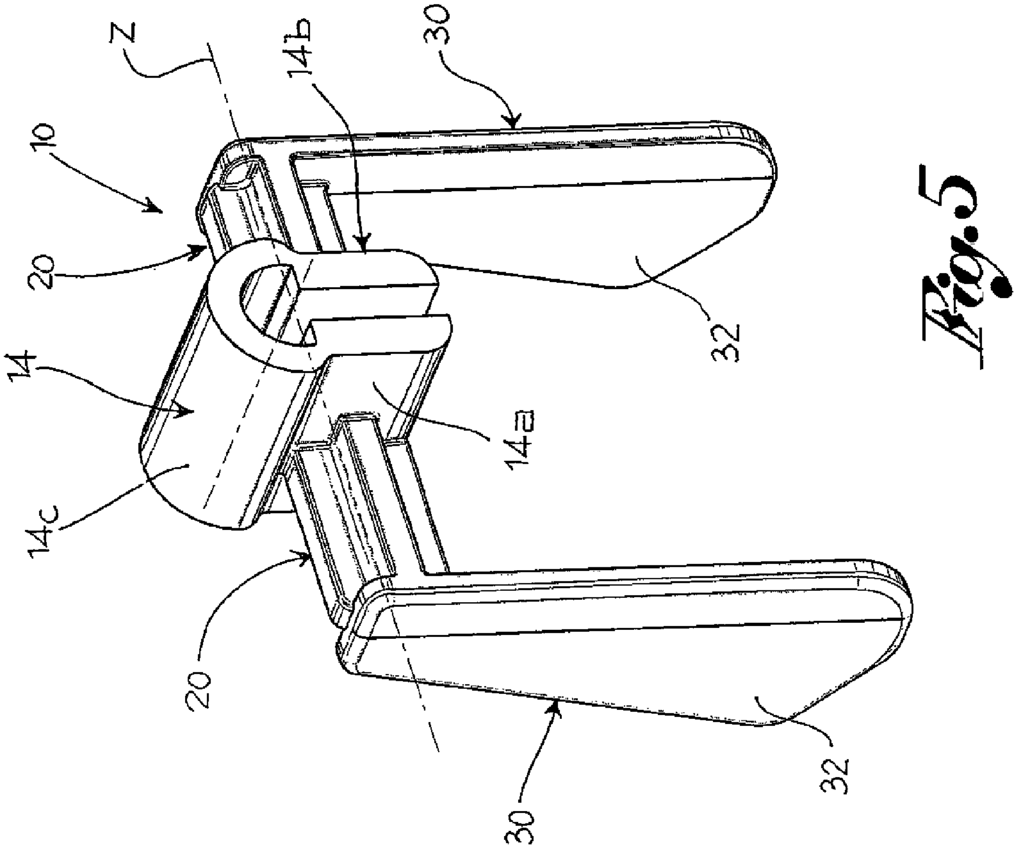
FIG. 5 shows the elastic element of FIG. 4, according to a back viewing direction.
Figure 7:
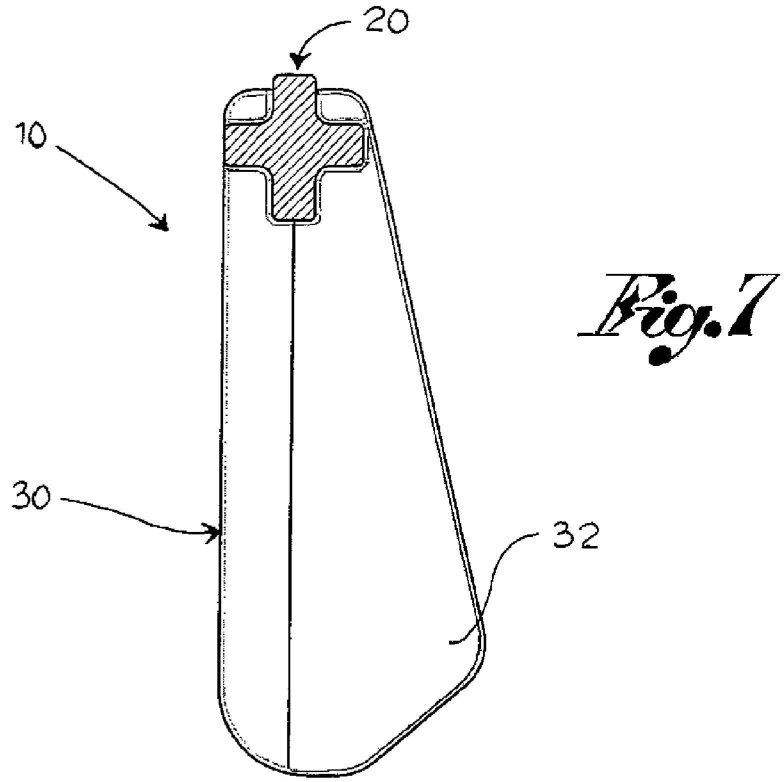
FIG. 7 shows a section view of the elastic element obtained according to line VII-VII of FIG. 6.
Figure 6:
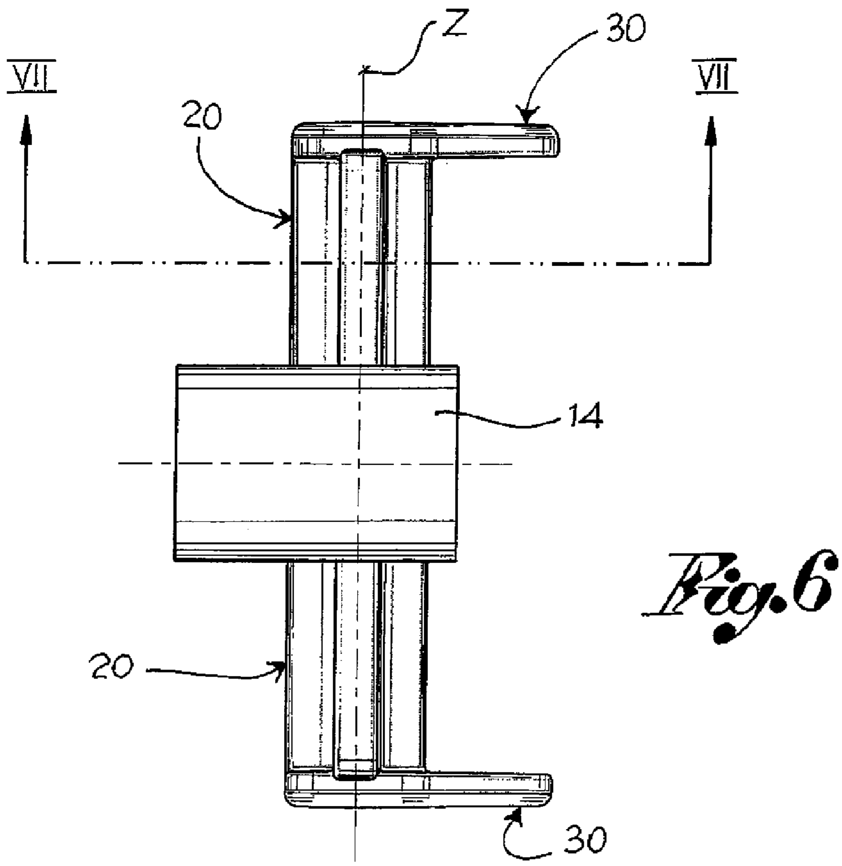
FIG. 6 shows a plan top view of the elastic element.

With reference to the annexed figures, reference numeral 1 globally indicates a dispensing head suitable for being associated to a container for containing the fluid, generally a liquid, for making a dispensing device.

The dispensing head 1 comprises pumping means comprising dispensing means suitable for sucking the fluid from the container and being actuated for dispensing the fluid outside the device.

The dispensing means comprise an enclosure 2 that delimits a pumping chamber therein for containing the amount of fluid to be dispensed and a piston 4 suitable for sliding in the enclosure along a dispensing axis for forcing the amount of fluid to be dispensed to dispensing.

For example, moreover, the dispensing means comprise an intake duct suitable for placing in fluid communication the pumping chamber with the interior of the container, for allowing the sucked fluid to be fed to the intake chamber.

For example, the dispensing means comprise a dispensing duct suitable for placing in fluid communication the pumping chamber with the environment outside the device, so that the fluid into the pumping chamber, under the action of piston 4, may be dispensed outside the device.

According to a preferred embodiment, the dispensing duct is contained, at least partly, within piston 4 and ends with a plurality of openings that allow the fluid escape to the exterior.

Moreover, the pumping means comprise actuating means suitable for being handled for actuating the dispensing means; for example, the actuating means comprise an articulated trigger 6, which actuated by a user influences the piston pushing it inside the pumping chamber.

In particular, actuating trigger 6, the head switches from a stand-by configuration, wherein the pumping chamber delimited by the piston exhibits a maximum volume, to a dispensing configuration wherein the pumping chamber exhibits a reduced volume, smaller than the maximum volume, since the piston sliding into the chamber is more inserted into the enclosure.

From the stand-by configuration to the dispensing configuration, the piston shifts along a dispensing axis X and according a dispensing direction; from the dispensing configuration to the stand-by configuration, the piston shifts along the shifting axis X, according to a return direction.

The reduction of volume in the pumping chamber causes the fluid dispensing to the exterior Further details can be found in the European patent application No. 06 425 779.3 by the Applicant, whose contents relating to the structure and functionality of the pumping means is incorporated herein.

In particular, according to a preferred embodiment, the actuating means comprise an articulation body 8, to which trigger 6 is articulated, for example hinged.

The hinging body 8 is integral to enclosure 2, surmounts the pumping chamber and is made in a single piece therewith.

Moreover, head 1 comprises elastic return means suitable for constantly influencing the pumping means from the dispensing configuration to the stand-by configuration.

The elastic return means are arranged outside the pumping chamber and comprise a return element 10, engaged with the pumping means at an active portion thereof; in the embodiment described, the active portion of the pumping means with which the return element 10 is engaged with a portion of piston 4, and in particular a radial projection 12 protruding from the piston stem.

The elastic element 10 comprises a coupling portion 14 suitable for coupling the return element with an abutment 16 of the pumping means.

Preferably, the coupling portion 14 is a cylindrical element that extends along the direction of the dispensing axis X, internally shaped for obtaining a shape coupling with abutment 16.

For example, the coupling portion comprises a pair of close walls 14*a*, 14*b*, which arrange side by side to abutment 16 and transversally spaced from each other, and an arched wall 14*c*, which joins the close walls to each other at the top, arranging astride of abutment 16.

Preferably, abutment 16 is an elongated element mainly along the direction of the dispensing axis X, parallel thereto, projecting from enclosure 2, such as to surmount the pumping chamber and made as a single piece with the enclosure.

In other words, abutment 16 exhibits a track configuration, for example comprising an elongated shelf 16*a*, protruding at the two sides of a bearing wall 16*b*, in axis with the dispensing axis X.

Abutment 16 is suitable for coupling with the coupling portion 14 of the return element 10 by sliding thereof along the direction of the dispensing axis, according to a feeding direction that coincides with the piston return direction.

In yet other words, a front end, facing the fluid dispensing side, and a back end, opposite the first one along the dispensing axis, are defined for abutment 16; the return element 10 can be slidingly coupled with abutment 16 since, thanks to a shape coupling between the coupling portion 14 and the abutment, it slides on abutment 16 entering through the back end.

For example, the close walls 14*a*, 14*b* of the coupling portion 14 arrange below the shelf 16*a* of abutment 16, arranging by the bottom portion of the bearing wall 16*b*, while the shelf arranges inside the arched wall 14*c* of the coupling portion 14.

At the front, the articulation body 8 for trigger 6 makes a travel end or stop element for the return element 10.

Preferably, moreover, the pumping means comprise at least one tongue 18 protruding laterally from abutment 16 for obtaining a snap-wise coupling between the coupling portion 14 and the abutment 16, for preventing the disconnection between the coupling portion 14 and abutment 16 along the dispensing axis X in a direction opposite the feeding direction.

Moreover, the return element 10 comprises an elastic portion 20, integral with the coupling portion 14 and projecting therefrom along a torsion axis Z, inclined relative to the dispensing axis X, preferably perpendicular thereto.

The coupling portion 14 of the elastic return element 10 is constrained to abutment 16 of the pumping means so as to prevent at least partly the stiff rotation of the elastic portion 20 about the torsion axis Z, obtaining a return action on the pumping means from the dispensing configuration to the stand-by configuration, Preferably, the elastic portion 20 of the return element 10 exhibits a cross section, that is, a section on a plane perpendicular to the torsion axis Z, having a cross shape.

Preferably, moreover, the return element 10 comprises at least one arm 30, integral with the elastic portion 20, for the engagement with the pumping means, for example with projections 12 of piston 4.

Preferably, moreover, arm 30 exhibits a protuberance 32 for approaching the active portion of the pumping means, that is, in the variation shown, for approaching projections 12 of piston 4.

For example, the return element 10 is arranged astride of the pumping chamber, arms 30 are in a number of two and extend alongside the pumping chamber.

Preferably, moreover, the structure of the return element 10 is symmetrical relative to a plane perpendicular to the torsion axis and containing the dispensing axis X.

According to a preferred embodiment, the return element 10 is made in a single piece, for example of plastic material, in particular of polyoxymethylene resin (POM).

According to a preferred embodiment, moreover, head 1 comprises closing means suitable for removably coupling enclosure 2 with the neck of the container.

For example, the closing means comprise a skirt 40 in a single piece with enclosure 2, connectable to the container neck by a screwing or bayonet-wise system.

Preferably, moreover, head 1 comprises a covering 100, suitable for covering at least partly the pumping means and/or the closing means, for making a convenient support for the user's hand.

In the normal use of the dispensing device, by repeatedly actuating trigger 6, this acts on piston 4 unilaterally.

For example, from the stand-by configuration, pressing trigger 6, the piston is stressed so as to penetrate more into the enclosure, causing the fluid dispensing.

The piston shifting causes the rotation of arm 30, substantially in a stiff manner, about the torsion axis; since arm 30 is integral to the elastic portion 20 at an end thereof, while at the other end the stiff rotation of the elastic portion 20 is at least partly prevented, the elastic portion 20 undergoes a torsion deformation about the torsion axis Z.

At the end of the dispensing, releasing trigger 6, the elastic portion 20 exhibits the tendency to return to the non-deformed configuration, thereby acting on arm 30 that pushes piston 4 in the initial stand-by configuration.

Innovatively, the head according to the present invention exhibits high reliability, and in particular a special resistance of the return element to withstand a high number of cycles.

In fact, the structure of the return element and the arrangement thereof causes in the elastic portion the onset, almost exclusively, of a torsion strain status, less aggressive than those of bending found in the elastic elements of the prior art.

According to a further advantageous aspect, the head assembly is very fast, since the return element can be mounted by shifting along the dispensing axis, sliding on the enclosure abutment.

Advantageously moreover, the snap-wise system allows accurately and quickly positioning the return element.

According to an even further advantageous aspect, by suitably shaping the return element arm, it is possible to easily adapt the return element to pumping means having different dimensions or structure.

According to an embodiment variation the return element directly acts on the trigger, suitably constrained to the piston.

According to a further embodiment variation, the arm of the return element exhibits its own deformability, suitably designed.

According to an even further embodiment variation, a predetermined stiff rotation of the coupling portion relative to the abutment is allowed.

What is claimed is:

1. A dispensing head associable to a container for obtaining a fluid dispensing device, comprising:

pumping means comprising a) dispensing means that suck the fluid from the container and being actuated for dispensing the fluid outside the device, wherein the dispensing means comprise i) an enclosure delimiting a pumping chamber therein for containing the amount of fluid to be dispensed;

ii) a piston for sliding in the enclosure along a dispensing axis;

iii) an abutment projecting from the enclosure;

b) actuating means that actuates the dispensing means;

elastic return means that influences the pumping means from a dispensing configuration, wherein the chamber has a reduced volume, to a stand-by configuration, wherein the pumping chamber has a larger volume than the reduced volume, wherein the elastic return means are arranged outside the pumping chamber and comprise a) a return element, engageable with the pumping means at an active portion of the pumping means, comprising:

i) a coupling portion for coupling the return element with the abutment of the pumping means;

ii) an elastic portion, integral with the coupling portion and projecting therefrom along a torsion axis, wherein the torsion axis is inclined relative to the dispensing axis;

iii) at least one arm, integral with the elastic portion, for the engagement with the pumping means;

wherein the coupling portion of the elastic element is constrained to the abutment of the pumping means so as to prevent at least partly the stiff rotation of the elastic portion about the torsion axis, obtaining a return action on the pumping means from the dispensing configuration to the stand-by configuration.

2. A dispensing head according to claim 1, wherein the abutment and the coupling portion are slidingly coupled along the dispensing axis according to a feeding direction.

3. A dispensing head according to claim 2, wherein the abutment comprises at least one protruding tongue for obtaining a snap-wise coupling between the coupling portion and the abutment, for preventing the disconnection between the coupling portion and the abutment along the dispensing axis in a direction opposite the feeding direction.

4. A dispensing head according to claim 3, wherein the feeding direction is the piston shifting direction from the dispensing configuration to the stand-by configuration.

5. A dispensing head according to claim 1, wherein the abutment surmounts the pumping chamber.

6. A dispensing head according to claim 1, wherein the abutment is made in a single piece with the enclosure.

7. A dispensing head according to claim 1, wherein the actuating means comprise a trigger.

8. A dispensing head according to claim 7, wherein the actuating means comprise an articulation body to which the trigger is articulated.

9. A dispensing head according to claim 8, wherein the trigger is hinged to the articulation body.

10. A dispensing head according to claim 8, wherein the articulation body is made in a single piece with the enclosure.

11. A dispensing head according to claim 1, wherein the torsion axis is perpendicular to the dispensing axis.

12. A dispensing head according to claim 1, wherein the elastic portion has a cross section, obtained with a plane perpendicular to the torsion axis, having the shape of a cross.

13. A dispensing head according to claim 1, wherein the return element is arranged astride of the pumping chamber, wherein the at least one arm comprises two arms which extend alongside the pumping chamber.

14. A dispensing head according to claim 1, wherein the at least one arm has a protuberance for approaching the active portion of the pumping means.

15. A dispensing head according to claim 1, wherein the return element is engaged with the piston.

16. A dispensing head according to claim 15, wherein the return element is unilaterally engaged with the piston.

17. A dispensing head according to claim 1, wherein the return element is made in a single piece.

18. A dispensing head according to claim 1, wherein the return element is made of a plastic material.

19. A dispensing head according to claim 18, wherein the return element is made of a polyoxymethylene (POM) resin.

20. A dispensing head according to claim 1, comprising closing means that removably couples the enclosure with a neck of the container.

21. A dispensing head according to claim 20, wherein the closing means comprise a skirt in a single piece with the enclosure.

22. A dispensing head according to claim 1, wherein the return element exhibits a symmetrical structure relative to a plane perpendicular to the torsion axis and containing the dispensing axis.

23. Fluid dispensing device comprising

A) a container for containing the liquid, comprising a neck that delimits an opening for accessing the container interior;

B) a dispensing head removably coupled to the container neck, wherein the dispensing head comprises pumping means comprising a) dispensing means that suck the fluid from the container and being actuated for dispensing the fluid outside the device, wherein the dispensing means comprise i) an enclosure delimiting a pumping chamber therein for containing the amount of fluid to be dispensed;

ii) a piston for sliding in the enclosure along a dispensing axis;

iii) an abutment projecting from the enclosure;

b) actuating means that actuates the dispensing means;

elastic return means that influences the pumping means from a dispensing configuration, wherein the chamber has a reduced volume, to a stand-by configuration, wherein the pumping chamber has a larger volume than the reduced volume, wherein the elastic return means are arranged outside the pumping chamber and comprise a) a return element, engageable with the pumping means at an active portion of the pumping means, comprising:

i) a coupling portion for coupling the return element with the abutment of the pumping means;

ii) an elastic portion, integral with the coupling portion and projecting therefrom along a torsion axis, wherein the torsion axis is inclined relative to the dispensing axis;

iii) at least one arm, integral with the elastic portion, for the engagement with the pumping means;

wherein the coupling portion of the elastic element is constrained to the abutment of the pumping means so as to prevent at least partly the stiff rotation of the elastic portion about the torsion axis, obtaining a return action on the pumping means from the dispensing configuration to the stand-by configuration.

* * * * *